(12) United States Patent
Reese (10) Patent No.: US 8,147,247 B1
(45) Date of Patent: Apr. 3, 2012

(54) PERSONALIZED TRAFFIC SAFETY INSTRUCTION

(75) Inventor: Carl Reese, San Diego, CA (US)

(73) Assignee: Carl Reese, Poway, CA (US)

( * ) Notice: Subject to any disclaimer, the term of this patent is extended or adjusted under 35 U.S.C. 154(b) by 1355 days.

(21) Appl. No.: 11/553,977

(22) Filed: Oct. 27, 2006

(51) Int. Cl.
*G09B 9/02* (2006.01)

(52) U.S. Cl. .................. 434/29; 434/62; 434/64; 434/65

(58) Field of Classification Search .................. 434/350, 434/322–323
See application file for complete search history.

(56) References Cited

U.S. PATENT DOCUMENTS

| | | | | |
|---|---|---|---|---|
| 4,426,084 A * | 1/1984 | Michel | | 273/254 |
| 5,184,956 A * | 2/1993 | Langlais et al. | | 434/69 |
| 5,275,565 A * | 1/1994 | Moncrief | | 434/29 |
| 5,573,402 A * | 11/1996 | Gray | | 434/69 |
| 5,577,913 A * | 11/1996 | Moncrief et al. | | 434/69 |
| 6,188,329 B1 * | 2/2001 | Glier et al. | | 1/1 |
| 6,227,862 B1 * | 5/2001 | Harkness | | 434/65 |
| 6,438,472 B1 * | 8/2002 | Tano et al. | | 701/29.6 |
| 7,668,724 B2 * | 2/2010 | Dutta et al. | | 705/1.1 |
| 7,668,863 B2 * | 2/2010 | Kalmick et al. | | 705/5 |
| 7,695,282 B2 * | 4/2010 | Lanktree | | 434/65 |
| 7,769,629 B1 * | 8/2010 | Kriza et al. | | 705/14.16 |
| 2004/0030587 A1 * | 2/2004 | Danico et al. | | 705/4 |
| 2004/0158476 A1 * | 8/2004 | Blessinger et al. | | 705/1 |
| 2006/0078853 A1 * | 4/2006 | Lanktree | | 434/62 |
| 2007/0015117 A1 * | 1/2007 | Freund et al. | | 434/65 |
| 2008/0254417 A1 * | 10/2008 | Mohamed | | 434/69 |
| 2008/0255869 A1 * | 10/2008 | Young et al. | | 705/1 |
| 2009/0319321 A1 * | 12/2009 | Pruskowski et al. | | 705/8 |

OTHER PUBLICATIONS

Chapter 176. Driver Training Schools Subchapter AA. Commissioner's Rules on Minimum Standards for Operation of Licensed Texas Driver Education Schools.*

* cited by examiner

*Primary Examiner* — Robert J Utama
(74) *Attorney, Agent, or Firm* — Sam Tahmassebi (57) ABSTRACT

Systems and methods are described for creating and delivering courses of personalized traffic safety instruction. Instruction courses are generated based on combinations of identifying information and demographic information of a student, one or more citations issued to the student and State requirements for coursework required in traffic school, including courses associated with the one or more citations. The course of instruction includes required and elective materials and typically is configured to meet a minimum time requirement. Citations associated with the student can be retrieved from government databases and course requirements associated with citations can be obtained from Courts and State agencies. Systems are described whereby instruction is delivered to the student using a computer system.

20 Claims, 8 Drawing Sheets

Figure 1

Example of a delivery platform

Safe2Drive
*Safer Driving Through Education*

Home  Info  Status  Payment  Contact                    Language [English]

Personalize Curriculum              Enter Citation

1 Enter License Info    ✓    ● Speeding         ○ Traffic Light Camera
                             ○ Failure to Stop  ○ Illegal U-Turn
2 Enter Citation        ▶    ○ Failure to Yield ○ School Bus Violation
                             ○ Illegal Passing  ○ Stopping on Railroad Tracks
3 Enter Profile 4 Answer Driver Survey 5 Create Curriculum
                                    [ Next ]

Safe2Drive
*Safer Driving Through Education*

Home  Info  Status  Payment  Contact                    Language [English]

Personalize Curriculum              Enter Profile

1 Enter License Info    ✓    Birth Date:          [          ]

2 Enter Citation        ✓    Gender:              [          ]

3 Enter Profile         ▶    Miles Driven Each Day: [        ]

4 Answer Driver Survey

5 Create Curriculum
                                    [ Next ]

Safe2Drive
*Safer Driving Through Education*

Home Info Status Payment Contact                           Language: English

Personalize Curriculum            Answer Driver Survey
                                       Question 1 of 3

1 Enter License Info    ✓    ◆ How often do you use a cell phone while driving?
2 Enter Citation        ✓        ● Never
3 Enter Profile         ✓        ○ 1 out of 4 trips
                                 ○ 3 out of 4 trips
4 Answer Driver Survey  ▶        ○ Always
5 Create Curriculum
                                       [ Next ]

Safe2Drive
*Safer Driving Through Education*

Home Info Status Payment Contact                           Language: English

Personalize Curriculum            Answer Driver Survey
                                       Question 2 of 3

1 Enter License Info    ✓    ◆ How recently have you nodded off while driving?
2 Enter Citation        ✓        ● Within past week
3 Enter Profile         ✓        ○ Within past six months
                                 ○ Within last year
4 Answer Driver Survey  ▶        ○ Never
5 Create Curriculum
                                       [ Next ]

Safe2Drive
*Safer Driving Through Education*

Home  Info  Status  Payment  Contact                        Language [English]

Personalize Curriculum               Answer Driver Survey
                                              Question 3 of 3

1 Enter License Info    ✓    ◆ Do you enjoy driving?

2 Enter Citation        ✓         ● Yes, I do very much
                                  ○ It is ok.
3 Enter Profile         ✓         ○ Not really.
                                  ○ I hate it.
4 Answer Driver Survey  ▶

5 Create Curriculum                     [ Next ]

Safe2Drive
*Safer Driving Through Education*

Home  Info  Status  Payment  Contact                        Language [English]

Personalize Curriculum               Create Curriculum
                                              8-Hour Traffic School 1 Enter License Info    ✓    ◆ Requisite Topics
                                Ways To Avoid Speeding                  ☑  90 mins
2 Enter Citation        ✓
                                Defensive Driving Strategies            ☑  90 mins
3 Enter Profile         ✓       Dealing with Aggressive Driving Tendencies ☑ 120 mins 4 Answer Driver Survey  ✓       Recognizing Symptoms of Drowsiness      ☑  60 mins 5 Create Curriculum     ▶    ◆ Elective Topics Child Safety Seats                      ☑  60 mins
                                Today's Safest Cars                     ☐  60 mins
                                How To Handle Mechanical Failures       ☐  60 mins
                                Techniques for City Driving             ☑  60 mins Total                                      480 mins

[ Next ]

PERSONALIZED TRAFFIC SAFETY INSTRUCTION

BACKGROUND OF THE INVENTION

1. Field of the Invention

This invention is related to traffic safety instruction. Traffic safety instruction is typically given by traffic schools to drivers who have committed a traffic offense.

2. Description of Related Art

Drivers who are cited for traffic violations usually have an option to attend traffic school to keep "points" or demerits off their driving record. Drivers have an incentive to attend traffic school because points adversely impact insurance premiums. In the extreme drivers with too many points may have their license suspended.

Figure 1:
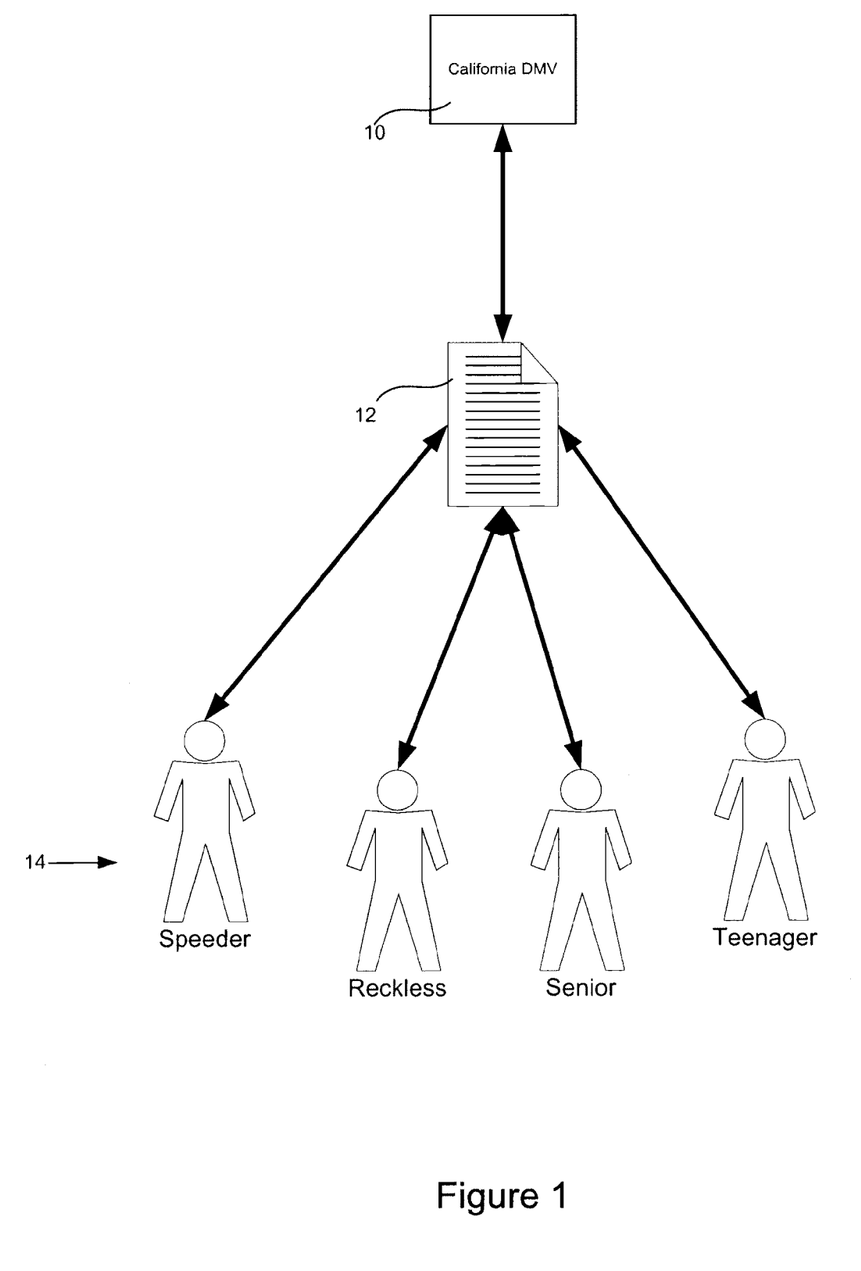
FIG. 1 lists required topics in California traffic school.

Each state in the U.S. administers its own traffic school program. Traffic schools that wish to operate in a given state must obtain a license from that state. In most cases the Department of Motor Vehicles (DMV) is the state agency assigned to administer traffic school programs. States mandate the topics that must be included in a traffic school's curriculum. The curriculum covers principles of safe driving, driver responsibility, and licensing regulations. For example, the California Department of Motor Vehicles 10 mandates the sixteen topics 12 listed in Table 1 and as shown in FIG. 1. Traffic schools have latitude on how the material is presented. Some, for example, choose a comedic format to make the material more engaging. However, schools do not have latitude in what topics are presented. States also mandate the length of time drivers 14 must spend in traffic school. In California, for example, eight hours are required.

TABLE 1

California Traffic School Topics

| | |
|---|---|
| Common Sense of Driving | City Driving |
| Safety Equipment | Freeway Driving |
| Defensive Driving | Driving on the Open Highway |
| Established Speed Laws | Hazardous Conditions |
| Proper Lane Use | Alcohol and Other Drugs |
| Backing Up Safely | Driver Responsibility |
| Intersections | Traffic Signs and Signals |
| Passing | Licensing Measures |

All traffic schools deliver the same topics to all drivers. A driver with a speeding citation is presented the same topics as one with a citation for reckless driving. A senior driver is presented the same topics as a teenager. Therefore, drivers are compelled to sit through topics that are often irrelevant to their personal situation and attention span can quickly wane, especially given the large number of topics mandated by the States.

A primary goal of traffic schools is to improve knowledge and attitudes toward traffic safety among drivers. However, two studies indicate that traffic school attendance produces relatively small improvements in knowledge and no measurable improvement in driving attitudes. One study was conducted by the Automobile Club of Southern California (ACSC), and the other by the California DMV recently completed studies examining the effects of traffic schools.

Taken together, the two studies support the following conclusions:

Exposure to traffic school had only a small effect in improving the knowledge level of attendees. Although the gain in knowledge was statistically significant, the gain was small-ranging from 5% to 8% across both studies. The level of knowledge retention 6-12 months after class is even smaller.

Driving attitudes are unchanged both at the time of traffic school and 6-12 months later.

Knowledge change and attitude change were not significantly related to method of instruction, type of provider, or use of an inducement to attract enrollees.

There was no significant relationship between knowledge gain and subsequent accident involvement, or between attitude change and driver record entries.

Knowledge gain was associated with fewer subsequent traffic citations; however, the magnitude of the relationship was small.

BRIEF SUMMARY OF THE INVENTION

It is an object of this invention to provide systems and methods for delivering personalized traffic safety instruction. Such instruction may be delivered by the Internet. Uniquely tailored instructional material can be delivered to drivers in their home or anywhere they have access to the Internet. According to certain aspects of the invention, personalized instruction can be based on a traffic citation, personal profile, driving behavior and personal interest.

It is an object of this invention to provide systems and methods for delivering personalized instruction that is more relevant and engaging than conventional traffic safety instruction. Certain aspects of the invention provide more focused and less time-consuming methods of achieving and surpassing the improvement in knowledge level typically found in conventional traffic schools.

It is an object of this invention to provide systems and methods for delivering personalized curriculum that comprises both requisite topics and elective topics. In certain embodiments, requisite topics are topics the driver must take. Requisite topics are typically based on a driver's citation, profile, and driving behavior. For example, a driver with a speeding ticket may be required to take topics focused on defensive driving strategies for drivers who speed, traffic laws relating to speed, and ways to avoid speeding drivers. Elective topics are topics the driver chooses because of a personal interest. For example, a soon-to-be father or mother may choose topics related to child passenger safety. Each topic may consist of lecture material, audio, videos, or multimedia presentations.

It is an object of this invention to provide systems and methods for delivering personalized instruction within the time allocated to complete the topic. For example, a topic on defensive driving strategies may be 20 minutes. The sum of the times in a personalized curriculum will typically be equal to the time a state mandates for traffic school. For example, in California, the personalized curriculum must consist of requisite and elective topics that total eight hours. Although the time drivers must spend in traffic school is an adjustable parameter and the default value is the time mandated by the state, time taken can be adjusted up or down based on the relative effectiveness of personalized instruction.

BRIEF DESCRIPTION OF THE DRAWINGS

These and other features, aspects and advantages of the present invention will be more fully understood when considered with respect to the following detailed description, appended claims and accompanying drawings wherein:

FIGS. 5*a*-5*c* illustrates examples of screenshots of pages displayed in one example of a citation data entry process;

FIGS. 7*a*-7*c* illustrates examples of screenshots of pages displayed in one example of a driver survey;

DETAILED DESCRIPTION OF THE INVENTION

Embodiments of the present invention will now be described in detail with reference to the drawings, which are provided as illustrative examples so as to enable those skilled in the art to practice the invention. Notably, the figures and examples below are not meant to limit the scope of the present invention to a single embodiment, but other embodiments are possible by way of interchange of some or all of the described or illustrated elements. Wherever convenient, the same reference numbers will be used throughout the drawings to refer to same or like parts. Where certain elements of these embodiments can be partially or fully implemented using known components, only those portions of such known components that are necessary for an understanding of the present invention will be described, and detailed descriptions of other portions of such known components will be omitted so as not to obscure the invention. In the present specification, an embodiment showing a singular component should not be considered limiting; rather, the invention, is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the components referred to herein by way of illustration With reference to FIG. 2, certain embodiments of the invention deliver personalized traffic safety instruction using the Internet 26 although any suitable public or private network can be employed as a delivery mechanism. Users of the system, typically drivers (also referred to herein as students), can receive instruction using a suitable computing device 24 equipped with a browser and an internet connection. Traffic schools 22 may host a web site comprising a web server 220 and a database 222 and can optionally connect to State Government ("the State" or "the States") office by electronic connection, in this example, the Internet 26.

Figure 2:
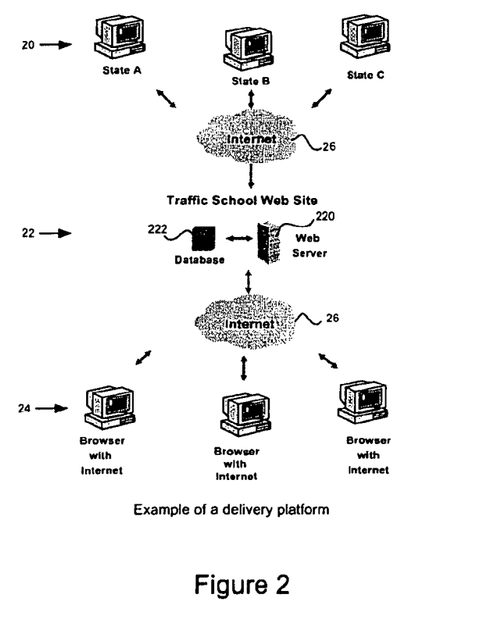
FIG. 2 depicts an example of a platform for delivering customized traffic safety instruction.
Figure 3:
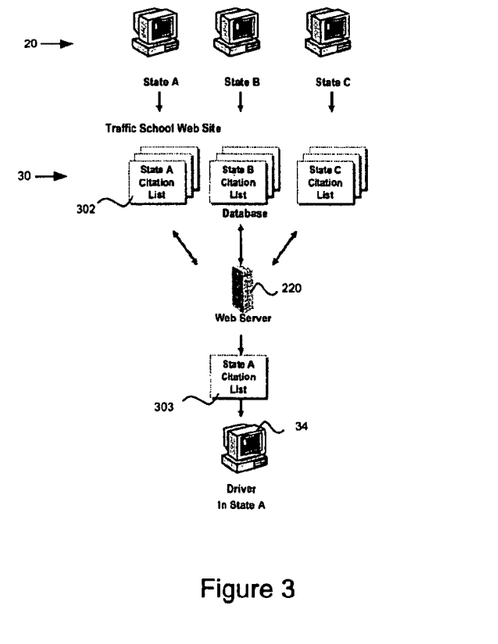
FIG. 3 depicts an example of selecting a citation list in a platform kir delivering customized traffic safety instruction.
Figure 4:
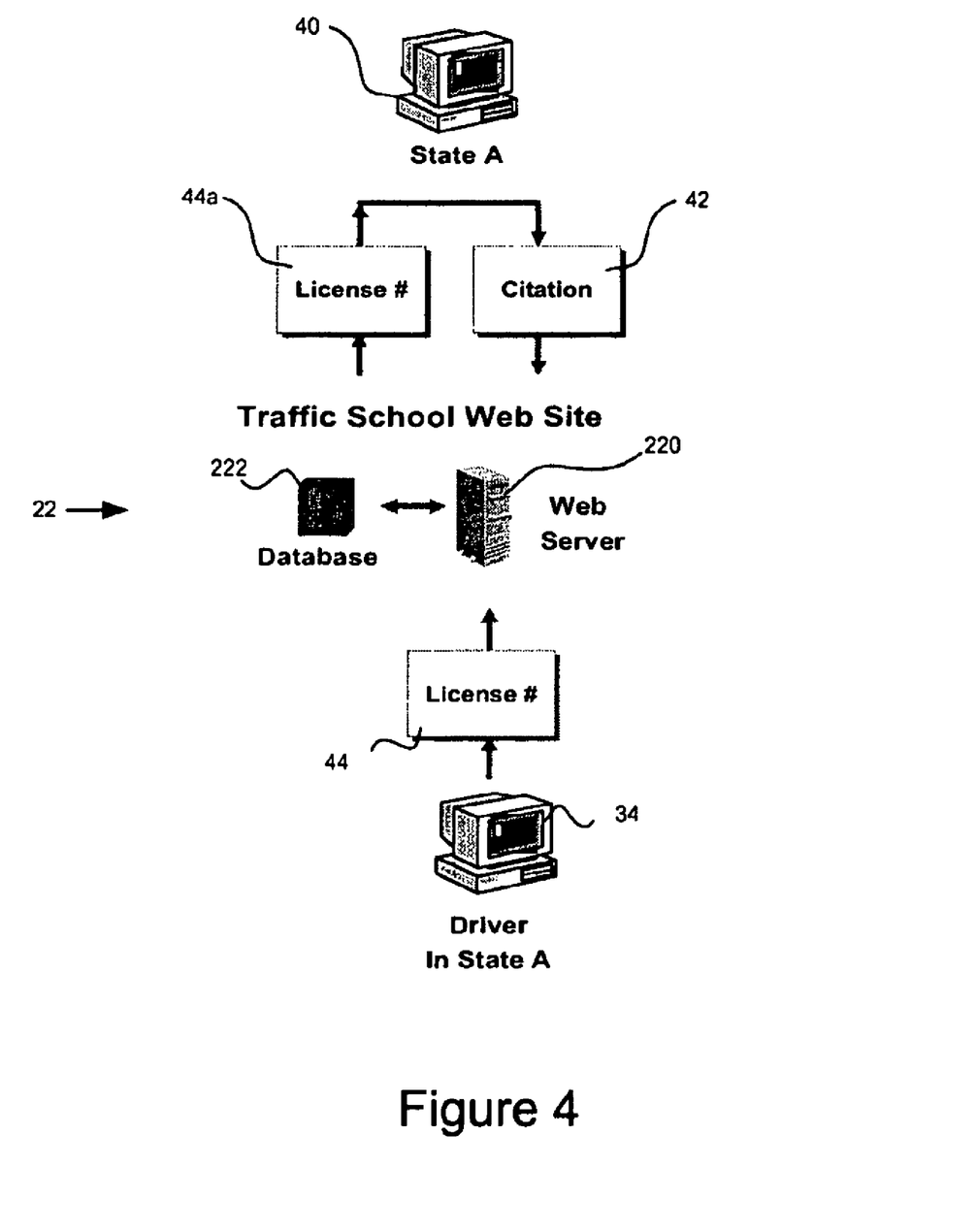
FIG. 4 depicts an example of retrieving a citation in a platform for delivering customized traffic safety instruction.

Referring now to FIGS. 2 and 3, instruction can be provided based in part on a driver's traffic citation. To identify personalized traffic safety instruction, a driver will typically provide information corresponding to citations 303 received by the driver. The information may include a citation number and can be provided to the system by driver data entry on a web page provided by the traffic school web server 220. In certain embodiments, citations information 302, including lists of citations issued by the States and citations issued for the driver, may be obtained directly from the States 20 by traffic school 22. In some embodiments, traffic school server 220 may obtain citation lists 30 from a plurality of the States 20. In certain embodiments, traffic school 22 may receive citations information 30 from court records. In some embodiments, citation lists 30 may be obtained from a plurality of sources. In particular, some sources, such as systems maintained by Courts, may not be able to electronically supply citation records on demand, may delay posting of citation lists or may restrict access to citation lists. Drivers may supply their citation 422 by entering an identifying code or citation number in a text box on a web page or by selecting it from a list 303. In some embodiments, traffic school 22 creates lists of citations 30 by manually entering each state's motor vehicle code into a database.

in certain embodiments, traffic school 22 can obtain citations issued to a driver based on identification of the driver. Drivers may be identified using any suitable form of identification including a driver license, identification number of a vehicle owned by the driver, biometric information such as fingerprints and any form of State or federally issued identification. With reference to FIGS. 2 and 4, in the example a driver's license 44 is required to retrieve citation information 42 from the courts. In some cases a driver may have more than one citation 42 pending. The court can typically identify which citations qualify for traffic school, based in part on the information provided in the license 44*a* presented by traffic school 22.

Figure 5A:
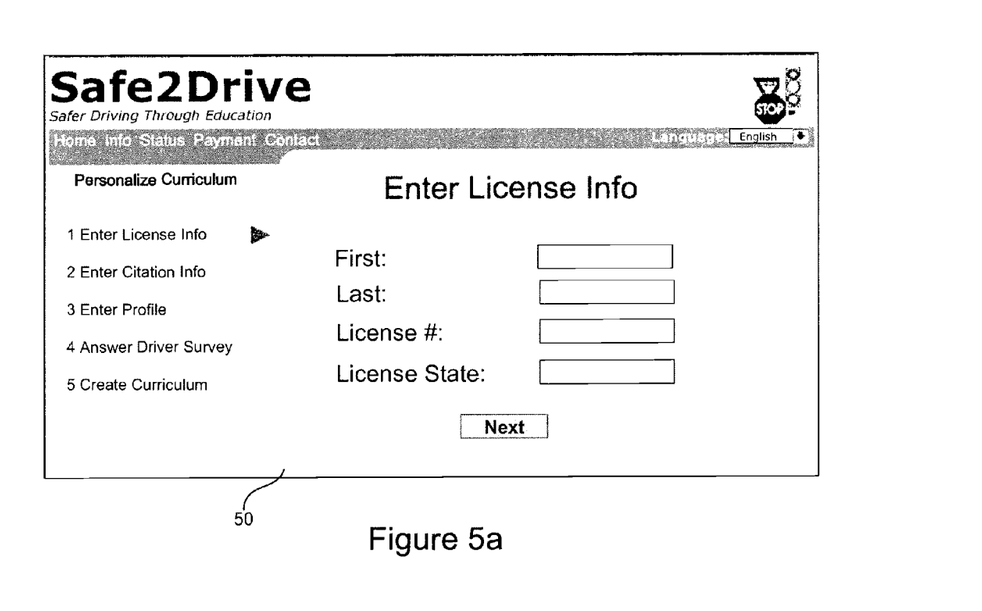
Figure 5B:
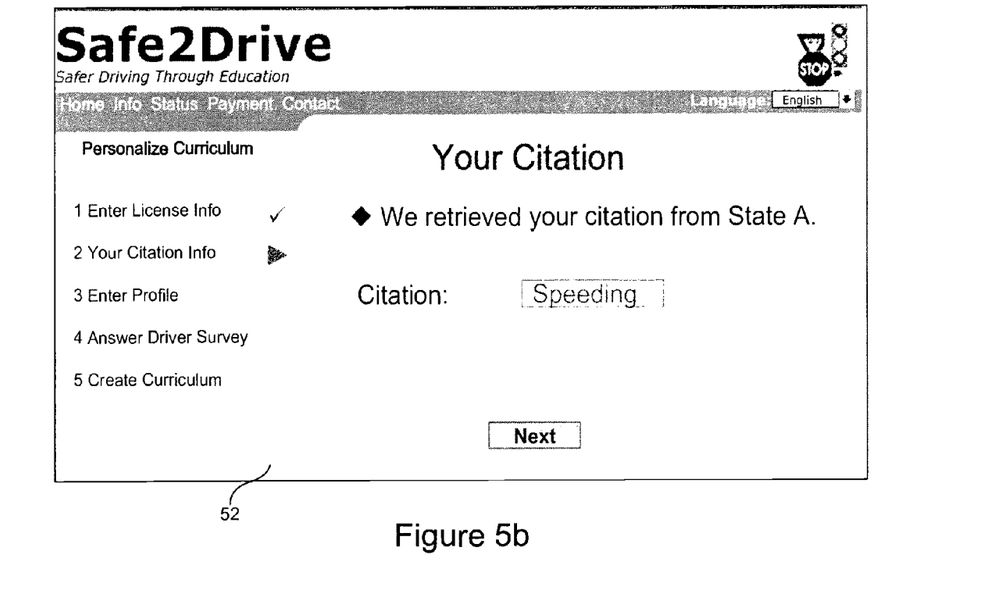
Figure 5C:
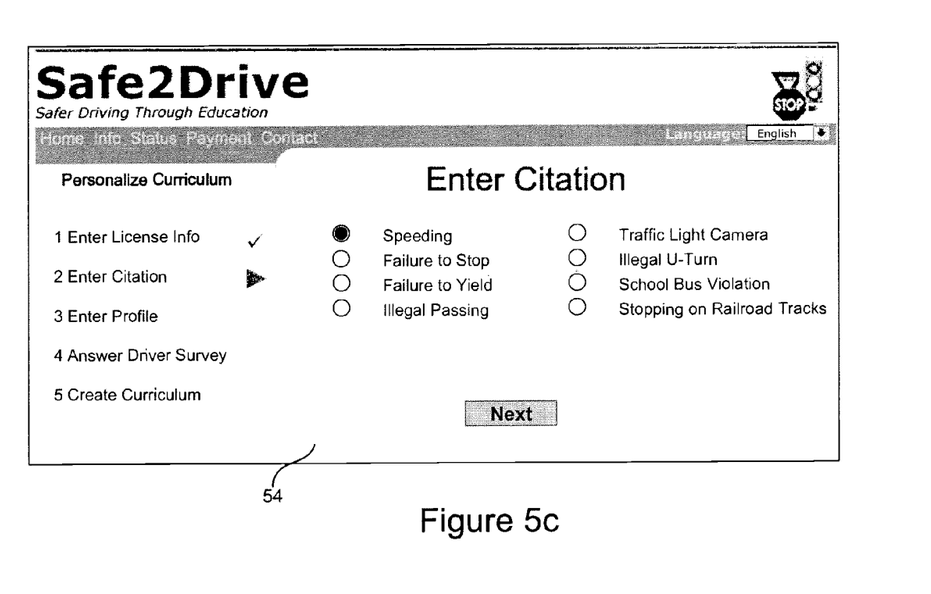

In certain embodiments, traffic school server 220 can collect information concerning the driver for purposes including registration of the driver as a student, obtaining citation information and to otherwise personalize activities related to traffic school 22. FIGS. 5*a*-5*d*, viewed together with FIG. 3 illustrates a data entry process as performed by a student. It will be appreciated that FIGS. 5*a*-5*c* represent examples of screenshots 50, 52 and 54 of pages displayed in one example of a data entry process and that personalized traffic safety instruction can be created for a student using other methods and sequences of requests. In a page, such as the one shown in the screenshot 50 depicted in FIG. 5*a*, the student is requested to supply information provided on his/her driver's license. The page depicted in the screenshot 52 of FIG. 5*b* displays the relevant citation information to the student and typically indicates the source of the information. However, in some embodiments, citation information may not be available electronically and a page similar to that of the screenshot 54 depicted in FIG. 5*c* may be provided to allow a student to select the relevant citation or citation type. The student may also directly enter a citation number to traffic school 22. In some embodiments, lists of citations presented to students are created by manual entry of each state's motor vehicle code into database 222.

Figure 6:
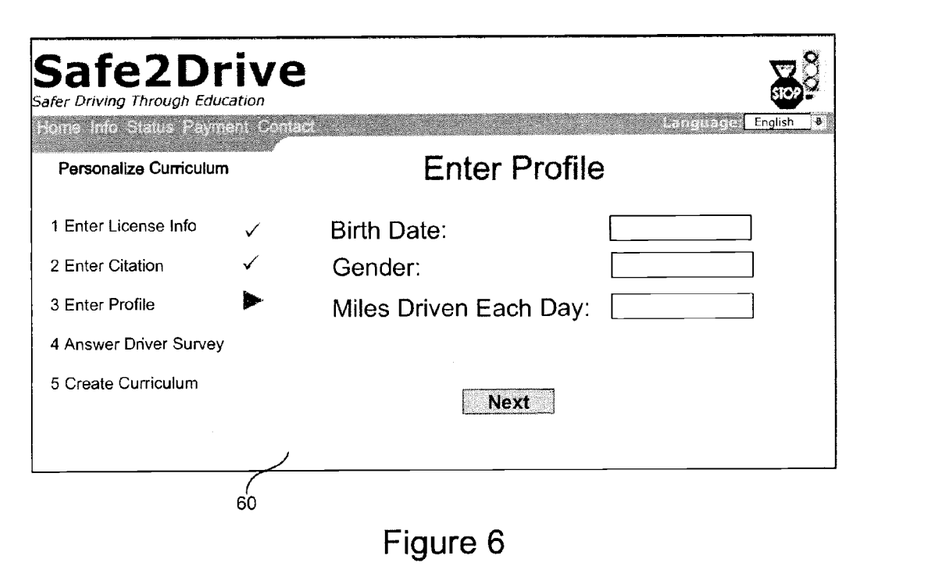
FIG. 6 illustrates an example of a screenshot of a page displayed in one example of a profile data entry process.

FIG. 6 provides a screenshot 60 depicting the form of a page that can be used to obtain information that may be used to profile a driver. The information can comprise birth date, gender, and miles driven each day are collected. The information can also comprise other profiling data such as type of roads driven including, for example, freeway/interstate, toll, carpool/HOV, rural and city.

Figure 7A:
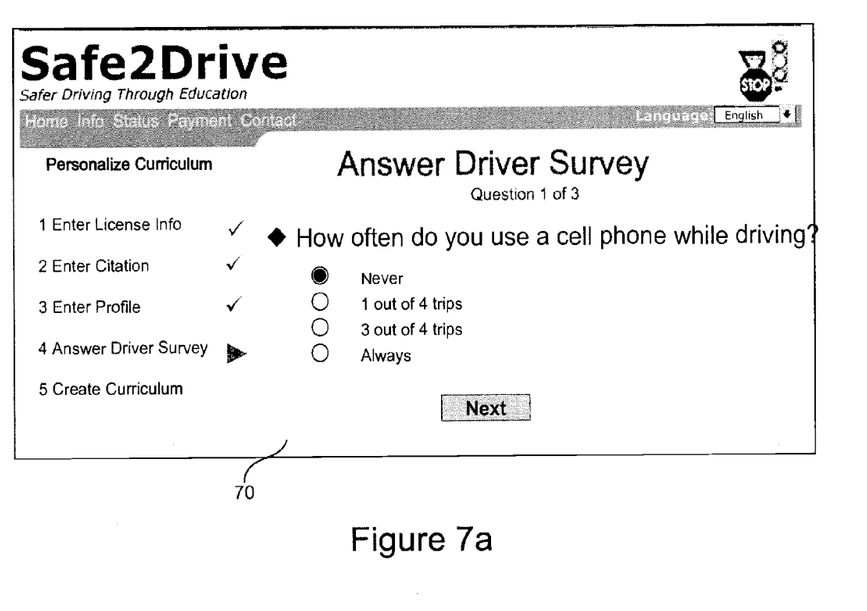
Figure 7B:
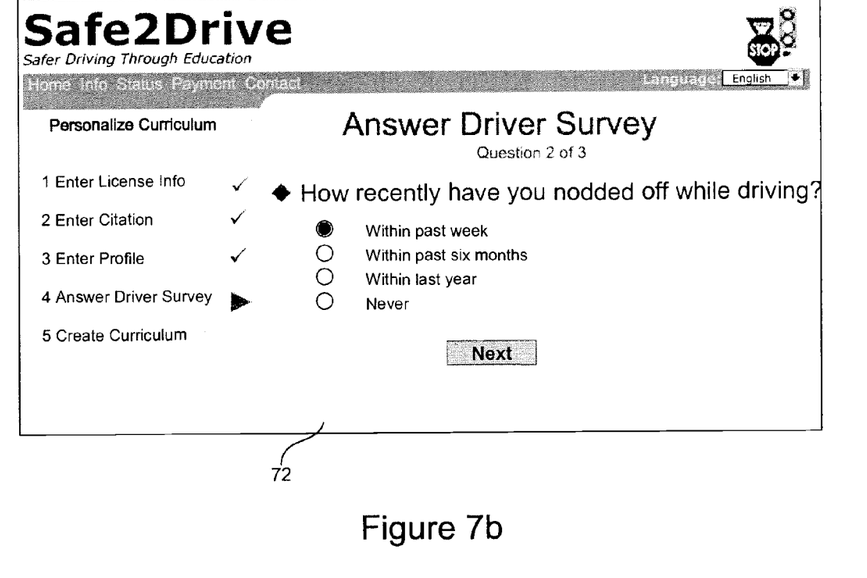
Figure 7C:
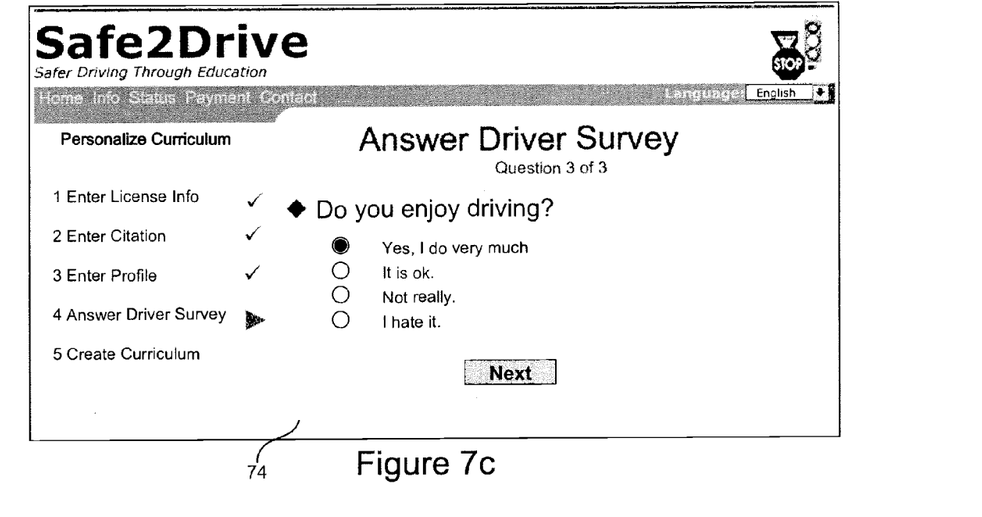

FIGS. 7*a*-7*c* provide screenshots 70, 72 and 74 depicting illustrative examples of pages configured to collect information that may be used to profile a driver's driving behaviors and other driver characteristics. The number and nature of questions may vary over time and may be based in part on citation type. In this example, the survey comprises three questions aimed at distracted driving, drowsy driving, and aggressive driving.

Figure 8:
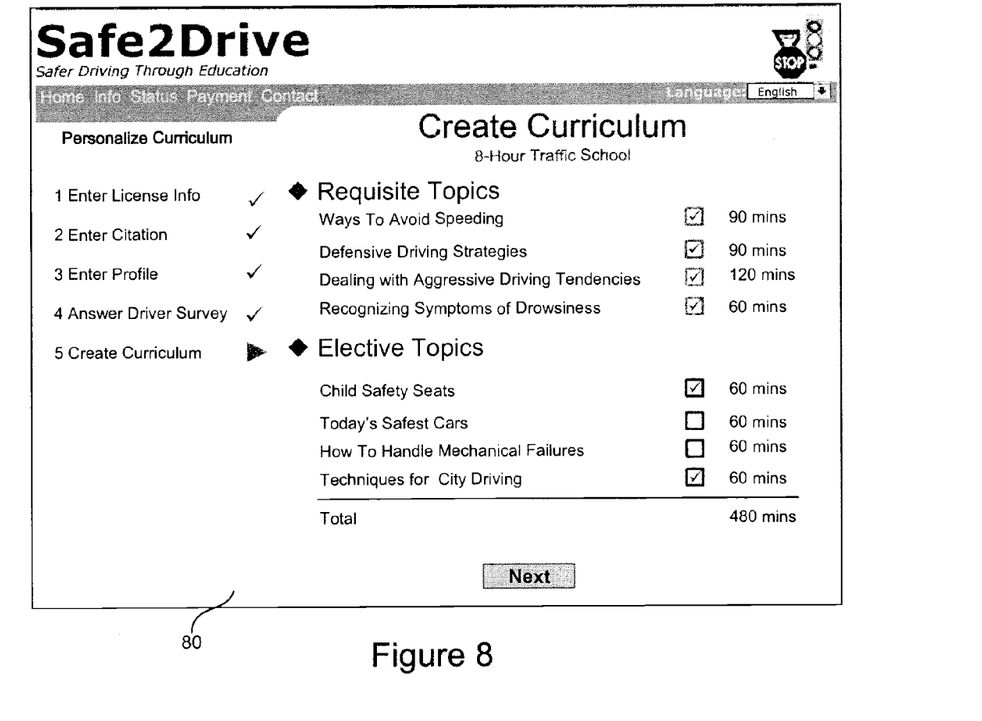
FIG. 8 illustrate an example of a screenshot of a page displayed in one example of a curriculum creation process.

In certain embodiments, a course of instruction (or curriculum) includes courses on topics that are required by the State and elective courses on topics related to traffic safety instruction. As illustrated in the screenshot 80 provided in FIG. 8, a curriculum can be personalized by allowing a student to select from among several optional courses of instruction. In certain embodiments, requisite topics are topics mandated by the State either for the specific citation issued to the student or as a general requirement. Thus, requisite topics are typically based on a driver's citation, profile, and driving behavior. For example, a driver with a speeding ticket may be required to take courses focused on defensive driving strategies for drivers who speed, traffic laws relating to speed, and ways to avoid speeding drivers. Elective topics are topics the driver chooses because of personal interest. For example, a soon-to-be father or mother may choose courses related to child passenger safety. Each course may consist of lecture material, audio, videos, or multimedia presentations. In the example, only four elective courses are shown, but many more may be included with no theoretical limit. In the example, a total instruction time, including requisite and elective courses, amounts to eight hours. This total instruction time is typical of the mandatory time required for traffic school.

Figure 9A:
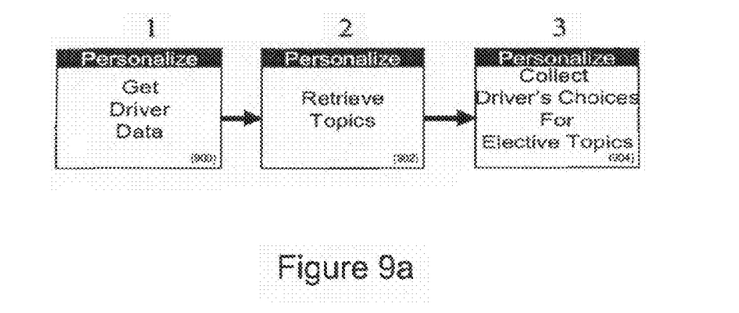
FIGS. 9*a* and 9*b* are flow charts representing certain aspects of delivering customized traffic safety instruction.

Referring now to FIG. 9a, in certain embodiments, a process for personalizing traffic safety instruction comprises the steps of receiving information identifying a driver at step 900, generating a list of required topics at step 902 and obtaining the driver's selections of elective topics at step 904. In some of these embodiments, a personalized traffic safety lesson plan is also created based on factors that include requirements of the authority issuing a citation, the nature and number of traffic citations issued, the student's personal profile, analysis of the student's driving behavior and identified personal interests of the driver. Traffic citations include citations for speeding, failure to yield, careless driving and so on. The personal profile includes age and gender of the student. Driving behaviors can include aggressive driving, distracted driving and so on. Personal interests include car safety, passenger safety, driving in inclement weather, defensive driving techniques and so on. In some of embodiments, the driver may select from categories, lists and preferences that vary in content and quantity with time.

Figure 9B:
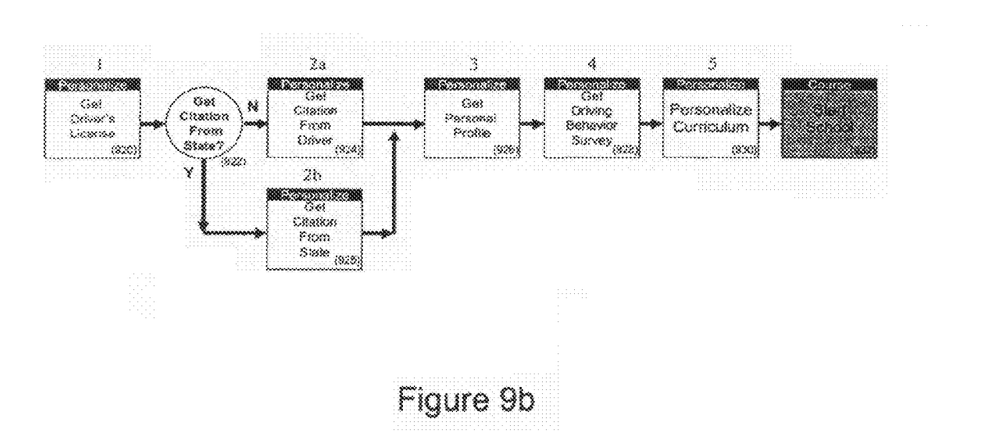

Referring now to FIG. 9b, in certain embodiments, a process for creating personalized traffic safety lesson plan comprises the steps of receiving identifying information of a driver at step (920), receiving information associated with a citation a steps 922, 924 or 925, obtaining a personal profile at step 926, obtaining a driving behavior survey at step 928, personalizing a curriculum at step 930 such that the student may commence school at step 932.

Additional Descriptions of Certain Aspects of the Invention

Certain embodiments of the invention provide systems and methods for creating and delivering a course of personalized traffic safety instruction. In some of these embodiments, instruction is generated for a student based on combinations of identifying information, demographic information of the student, one or more citations issued to the student and State requirements for coursework required in traffic school. In many of these embodiments, coursework requirements are related to the type of ticket issued. In some of these embodiments, instruction is delivered to the student using a computer system. In some of these embodiments, coursework is presented using the Internet to display images, video clips, questionnaires and tests.

In some of these embodiments, the identifying information can include information provided in a driver's license including a driver license number, a State of issuance, the driver's first and last name, date of birth and date of expiration. In some of these embodiments, the citation can be provided from the student or the state. In some of these embodiments, the driver license information can be used to obtain the citation information, wherein the citation information is provided by one or more of a court and DMV records.

In some of these environments, the demographic information is provided in personal profile of the student, wherein the personal profile includes a birth date and gender of the student. In some of these embodiments, the driver license information can be used to obtain at least a portion of the personal profile. In some of these embodiments, a driving behavior survey is obtained from the student, wherein the survey is obtained by presenting a series of questions to the student and processing responses to those questions. In some of these embodiments, the series of questions is used to identify a student's driving behavior. In some of these embodiments, a plurality of survey questions is maintained in a database. In some of these embodiments, one or more of the plurality of questions are retrieved for each student is based on the identifying information and the personal profile. In some of these embodiments, certain of the plurality of survey questions may be weighted according to the importance placed on them by the state's motor vehicle department.

In some of these embodiments, the instruction is prepared in a personalized curriculum that includes coursework associated with a plurality of selected courses. In some of these embodiments course topics are selected based on the identifying information, the personal profile and the one or more citations. In certain embodiments, the courses include requisite courses and elective courses. In some of these embodiments, the student may choose one or more electives sufficient to meet a minimum elective time. In some of these embodiments, the sum of the minimum elective time and a time required for the requisite topics is equal to or greater than a predetermined minimum time. In some of these embodiments, elective topics are selected by the student. In some of these embodiments, an algorithm is executed on a computer to select topics. In some of these embodiments, an algorithm is executed on a computer to organize the flow of selected topics. In some of these embodiments, an algorithm is executed on a computer to track progress of a course of instruction provided to the student and to report completion of the course of instruction to a State authority.

Although the present invention has been described with reference to specific exemplary embodiments, it will be evident to one of ordinary skill in the art that various modifications and changes may be made to these embodiments without departing from the broader spirit and scope of the invention. Accordingly, the specification and drawings are to be regarded in an illustrative rather than a restrictive sense.

What is claimed is:

1. A method for generating a personalized traffic safety instruction comprising:
   identifying a student;
   obtaining information regarding one or more citations received by the student;
   using a processor collecting answers to an online computerized driver survey given to the student;
   generating a personal profile for the student based on the answers to the survey; and
   generating a course of instruction information using a processor, wherein the course of instruction information comprises a first set of instructional materials and a second set of instructional materials, wherein the first set of instructional materials is selected from among instructional material mandated by a governmental agency and personalized based on the personal profile, and wherein the second set of instructional materials comprises a plurality of topics selected based on the personal profile.

2. The method of claim 1, wherein the personal profile includes demographic information of the student.

3. The method of claim 1, wherein the personal profile includes a driving behavior survey of the student.

4. The method of claim 1, wherein the first set of instructional materials comprises topics that are selected based on the governmental agency's requirements associated with the one or more citations.

5. The method of claim 1, wherein the second set of instructional materials further comprises elective topics selected by the student.

6. The method of claim 1, wherein the information regarding one or more citations is obtained from a Department of Motor Vehicles records.

7. The method of claim 4, wherein the information regarding one or more citations is obtained from a Court.

8. The method of claim 4, wherein the one or more citations are identified by the student and wherein the information regarding one or more citations are obtained from a database on the identification.

9. The method of claim 4, wherein the one or more citations are identified in a database populated from DMV records.

10. The method of claim 1, wherein the course of instruction is generated to provide a predetermined minimum length of instruction.

11. A system for generating personalized traffic safety instruction, comprising:
a computer readable medium comprising one or more databases, each database comprising a plurality of courses on topics associated with traffic safety;
a computer readable medium comprising a list of one or more citations, each citation in the list associated with one or more of the plurality of courses; and
a server configured to receive an identification of a citation issued to a student and a personal profile of the student and further configured to generate a course of instruction for the student wherein the course of instruction comprises a first set of instructional materials and a second set of instructional materials, wherein the first set of instructional materials is selected from among instructional material mandated by a governmental agency and personalized based on the personal profile, and wherein the second set of instructional materials comprises a plurality of topics selected based on the information regarding one or more citations and the personal profile, wherein the personal profile of the student is obtained by collecting answers, through the use of a processor, to an online computerized driver survey.

12. The system of claim 11, wherein the second set of instructional materials further comprises courses selected from the database by the student.

13. The system of claim 11, wherein the course of instruction includes courses selected from the database based on the personal profile.

14. The system of claim 11, wherein the personal profile includes demographic information of the student.

15. The system of claim 11, wherein the personal profile includes a driving behavior survey of the student.

16. The system of claim 11, wherein the courses mandated by the governmental agency comprise courses required for the one or more citations.

17. A method for generating a personalized traffic safety instruction course comprising:
obtaining information regarding one or more citations received by a student;
using a processor collecting answers to an online computerized driver survey given to the student;
generating a personal profile for the student based on the answers to the survey, wherein the personal profile comprises demographic information of the student and a driving behavior survey of the student;
generating a course of instruction information, information using a processor, wherein the course of instruction information comprises a first set of instructional materials and a second set of instructional materials, wherein the first set of instructional materials is selected from among instructional material mandated by a governmental agency and personalized based on the personal profile, and wherein the second set of instructional materials comprises a plurality of topics selected based on the one or more citations and the personal profile, the plurality of topics including elective topics selected by the student; and
delivering the course of instruction to the student.

18. The method of claim 17, wherein the student is identified by a driver license.

19. The method of claim 18, wherein the first set of instructional materials comprises topics that are selected based on the governmental agency's requirements associated with the one or more citations.

20. The method of claim 18, wherein the course of instruction is generated to provide a length of instruction mandated by government regulations.

* * * * *